(12) United States Patent
Arai et al.

(10) Patent No.: US 8,878,994 B2
(45) Date of Patent: Nov. 4, 2014

(54) INFORMATION PROCESSING APPARATUS, REMOTE OPERATION SUPPORT METHOD AND STORAGE MEDIUM

(71) Applicant: Kabushiki Kaisha Toshiba, Tokyo (JP)

(72) Inventors: Takahiro Arai, Ome (JP); Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/060,328

(22) Filed: Oct. 22, 2013

(65) Prior Publication Data

US 2014/0211088 A1     Jul. 31, 2014

Related U.S. Application Data

(63) Continuation of application No. PCT/JP2013/058399, filed on Mar. 22, 2013.

(30) Foreign Application Priority Data

Jan. 31, 2013 (JP) ................................ 2013-017131

(51) Int. Cl.
*H04N 7/00* (2011.01)
*H04N 11/00* (2006.01)
*H04N 5/44* (2011.01)
*H04N 5/445* (2011.01)
*H04N 21/41* (2011.01)

(52) U.S. Cl.
CPC ......... *H04N 21/4126* (2013.01); *H04N 5/4403* (2013.01); *H04N 5/44582* (2013.01)
USPC ........... 348/552; 348/553; 348/523; 348/563; 348/564; 348/565; 348/567; 348/569; 348/636; 348/656; 348/680; 348/693; 348/706; 348/716; 348/723; 348/725; 348/729; 348/734; 348/211.2; 348/231.1; 348/231.3; 725/25; 725/37; 725/38; 725/39; 725/40; 725/44; 725/68; 725/80; 725/81; 725/85; 725/89; 725/100; 725/110; 725/115; 725/117; 725/120; 725/123; 725/131; 725/139; 725/147; 725/151; 345/156; 345/157

(58) Field of Classification Search
USPC ........... 348/552, 734, 14.02, 211.2, 564, 565, 348/563, 725, 553, 523, 567, 569, 636, 656, 348/680, 693, 706, 716, 723, 729, 231.1, 348/231.3, 141; 725/39, 40, 81, 123, 25, 725/37, 38, 44, 68, 80, 85, 89, 100, 110, 725/115, 117, 120, 131, 139, 147, 151; 345/156, 157

See application file for complete search history.

(56) References Cited

U.S. PATENT DOCUMENTS 7,610,555 B2 * 10/2009 Klein et al. ................... 715/738
8,646,000 B2 *  2/2014 Kang et al. ..................... 725/39

(Continued)

FOREIGN PATENT DOCUMENTS

JP     2007-199764     8/2007
JP     2009-055614     3/2009

(Continued)

OTHER PUBLICATIONS

International Search Report for corresponding application No. PCT/JP2013/058399, dated Apr. 16, 2013, in 11 pages.

*Primary Examiner* — Jefferey Harold
*Assistant Examiner* — Mustafizur Rahman
(74) *Attorney, Agent, or Firm* — Knobbe, Martens, Olson & Bear, LLP

(57) ABSTRACT

According to one embodiment, an information processing apparatus includes a first receiver, a screen transmitter, a second receiver and a controller. The first receiver receives first information associated with a display function of an external device. The screen transmitter generates an operation screen for operating the apparatus based on the first information, and transmits a video signal of the generated operation screen to the external device. The second receiver receives second information associated with content of an operation on the operation screen from the external device. The controller controls operation of the apparatus based on the second information.

9 Claims, 4 Drawing Sheets

(56) References Cited

U.S. PATENT DOCUMENTS

| | | | |
|---|---|---|---|
| 2003/0007104 A1* | 1/2003 | Hoshino et al. | 348/734 |
| 2003/0035074 A1* | 2/2003 | Dubil et al. | 348/734 |
| 2004/0243694 A1* | 12/2004 | Weast | 709/223 |
| 2006/0269056 A1* | 11/2006 | Montag | 380/205 |
| 2007/0136778 A1* | 6/2007 | Birger et al. | 725/117 |
| 2007/0290876 A1 | 12/2007 | Sato et al. | |
| 2008/0005764 A1* | 1/2008 | Arling et al. | 725/39 |
| 2009/0066855 A1 | 3/2009 | Kumano | |
| 2010/0082784 A1* | 4/2010 | Rosenblatt et al. | 709/222 |
| 2011/0138317 A1* | 6/2011 | Kang et al. | 715/780 |
| 2011/0138416 A1* | 6/2011 | Kang et al. | 725/39 |
| 2011/0138444 A1* | 6/2011 | Kang et al. | 726/3 |
| 2011/0153656 A1 | 6/2011 | Sundström et al. | |
| 2012/0032945 A1* | 2/2012 | Dare et al. | 345/418 |

FOREIGN PATENT DOCUMENTS

| | | |
|---|---|---|
| JP | 2009-065600 | 3/2009 |
| JP | 2010-130445 | 6/2010 |
| JP | 2011-010196 | 1/2011 |
| WO | WO 2008/087829 | 7/2008 |
| WO | WO 2009/149967 | 12/2009 |

\* cited by examiner

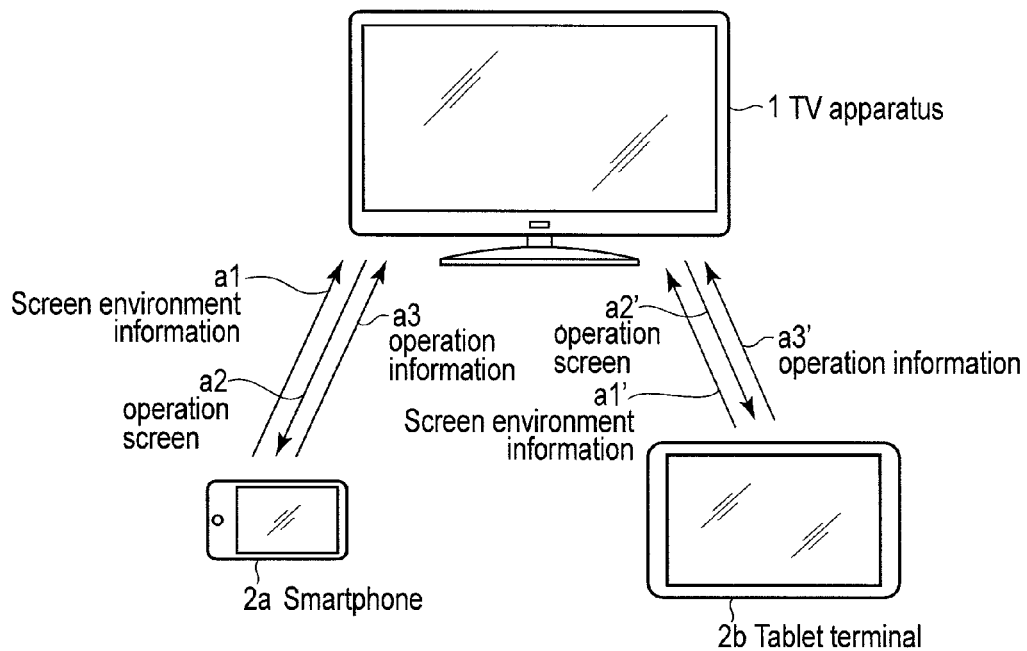
F I G. 1
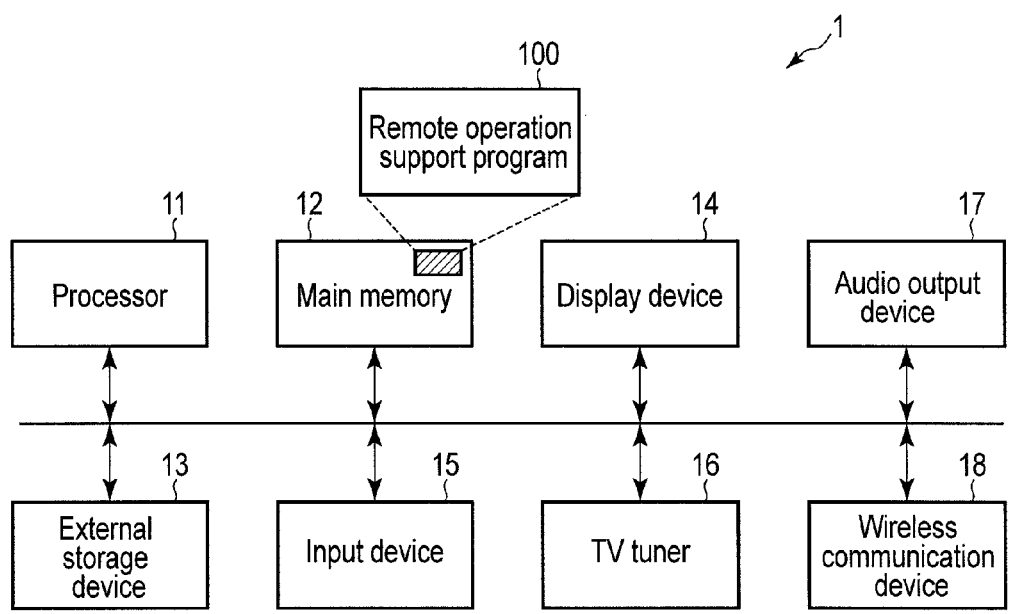
F I G. 2

INFORMATION PROCESSING APPARATUS, REMOTE OPERATION SUPPORT METHOD AND STORAGE MEDIUM

CROSS-REFERENCE TO RELATED APPLICATIONS

This application is a Continuation application of PCT Application No. PCT/JP2013/058399, filed Mar. 22, 2013 and based upon and claiming the benefit of priority from Japanese Patent Application No. 2013-017131, filed Jan. 31, 2013, the entire contents of all of which are incorporated herein by reference.

FIELD

Embodiments described herein relate generally to a user interface technique suitable for an information processing apparatus including a wireless communication function.

BACKGROUND

Many television receivers (hereinafter, referred to as TV apparatuses) are capable of remote operations by a remote controller. Instead of dedicated remote controllers, tablet terminals and smartphones have recently been starting to be used to operate TV apparatuses.

Various proposals have heretofore been made for remote controls of information processing apparatuses including TV apparatuses.

To make TV apparatuses operable by tablet terminals, smartphones, and the like, TV apparatus manufacturers provide application programs for operating tablet terminals, smartphones, and the like as a remote controller (hereinafter, tablet terminals, smartphones, and the like used as a remote controller may be referred to as platform terminals).

However, the manufacturers need to develop application programs (for remotely operating a TV apparatus) for respective platform terminals. Meanwhile, if, for example, a user wants to operate a plurality of types of TV apparatuses by a tablet terminal, the user needs to install a plurality of application programs provided for the respective plurality of types of TV apparatuses.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram for explaining the outline of an operation principle related to a remote operation of an information processing apparatus (TV apparatus) according to an embodiment.

FIG. 2 is an exemplary diagram schematically showing a configuration of the information processing apparatus according to the embodiment.

DETAILED DESCRIPTION

Figure 3:
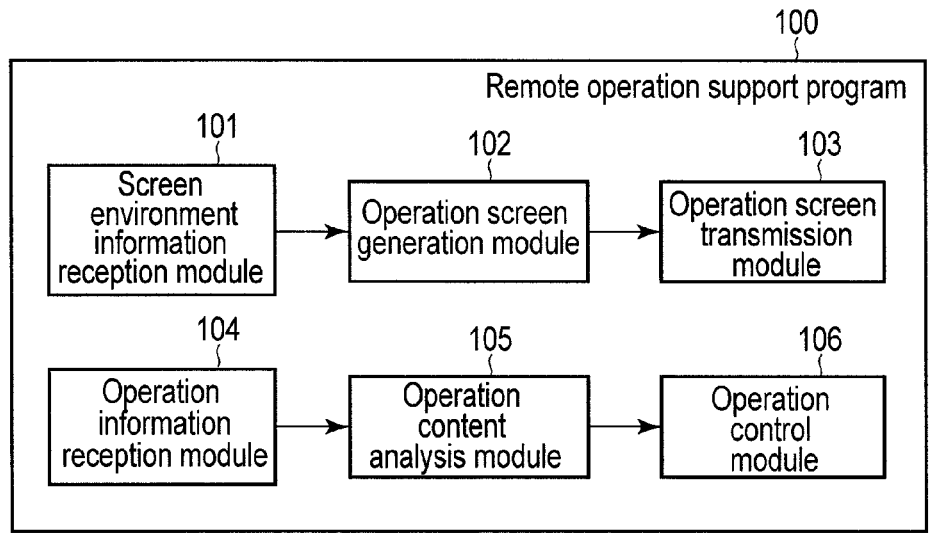
FIG. 3 is an exemplary diagram showing functional blocks of a remote operation support program operating on the information processing apparatus according to the embodiment.

Various embodiments will be described hereinafter with reference to the accompanying drawings.

In general, according to one embodiment, an information processing apparatus includes a wireless communication module, a first information receiver, an operation screen transmitter, a second information receiver and a controller. The first information receiver is configured to receive first information associated with a display function of an external device from the external device by wireless communication by the wireless communication module. The operation screen transmitter is configured to generate an operation screen for operating the apparatus based on the first information received by the first information receiver and to transmit a video signal of the generated operation screen to the external device by wireless communication by the wireless communication module. The second information receiver is configured to receive second information associated with content of an operation on an operation screen from the external device by wireless communication by the wireless communication module. The operation screen is displayed using the video signal transmitted by the operation screen transmitter. The controller is configured to control operation of the apparatus based on the second information received by the second information receiver.

FIG. 1 is an exemplary diagram for explaining the outline of an operation principle related to a remote operation of an information processing apparatus 1 according to the present embodiment. For example, the information processing apparatus 1 can be configured as a TV apparatus.

The TV apparatus 1 includes a wireless communication function compliant with a Wi-Fi™ standard, for example, and can transmit a video signal by wireless communication through a procedure compliant with a Wi-Fi Display standard. The Wi-Fi Display standard is capable of transmitting EDID (Extended Display Identification Data). A smartphone 2a and a tablet terminal 2b also include a wireless communication function complied with the Wi-Fi™ standard, for example, and can receive a video signal by wireless communication through a procedure compliant with the Wi-Fi Display standard. The smartphone 2a and the tablet terminal 2b also include a touch screen display capable of touch operations on the display.

For example, when a session for wireless communication with the smartphone 2a is established, the TV apparatus 1 receives EDID from the smartphone 2a, and acquires screen environment information such as a screen size, an aspect ratio, and resolution of the touch screen display included in the smartphone 2a from the EDID (a1 in FIG. 1). In other words, when a session for wireless communication with the TV apparatus 1 is established, the smartphone 2a transmits EDID to the TV apparatus 1.

Acquiring the screen environment information about the smartphone 2a, the TV apparatus 1 generates an operation screen (for operating the TV apparatus 1) suitable for the touch screen display included in the smartphone 2a, and transmits a video signal thereof to the smartphone 2a (a2 in FIG. 1). Using the video signal, the smartphone 2a displays an operation screen on the touch screen display. The generation of the operation screen based on the screen environment information includes not only simple scaling to the screen size, for example, but also the arrangement of operation buttons (operating objects) in consideration of the screen size, for example.

Since the touch screen displays included in the smartphone 2a and the tablet terminal 2b are somewhat limited in type, the generation of the operation screen may include selecting one from a plurality of operation screens prepared in advance.

According to the procedure compliant with the Wi-Fi Display standard, UIBC (User Interface Back Channel) including operation information about a touch operation and the like can be transmitted and received. When a touch operation is made on the touch screen display displaying the operation screen, the smartphone 2a transmits operation information to the TV apparatus 1 (a3 in FIG. 1). More specifically, the operation information is coordinate data on the operation screen.

The TV apparatus 1 then analyzes the content of the operation on the operation screen based on the operation information, and performs operation control such as zapping channels and displaying a program guide.

Similarly, when, for example, a session for wireless communication with the tablet terminal 2b is established, the TV apparatus 1 receives EDID from the tablet terminal 2b and acquires screen environment information about the touch screen display included in the tablet terminal 2b from the EDID (a1' in FIG. 1). Based on the screen environment information, the TV apparatus 1 generates an operation screen suitable for the touch screen display included in the tablet terminal 2b, and transmits a video signal thereof to the tablet terminal 2b (a2' in FIG. 1). Based on operation information transmitted from the tablet terminal 2b (a3' in FIG. 1), the TV apparatus 1 performs operation control of the TV apparatus 1.

Suppose that the touch screen display included in the smartphone 2a and the touch screen display included in the tablet terminal 2b have significantly different screen sizes. Here, the smartphone 2a displays an operation screen (for operating the TV apparatus 1) on which operation buttons are arranged according to the screen size of the touch screen display included in the smartphone 2a. Meanwhile, the tablet terminal 2b displays an operation screen (for operating the TV apparatus 1) on which operation buttons are arranged according to the screen size of the touch screen display included in the tablet terminal 2b.

The same application program for performing the foregoing operation is installed in the smartphone 2a and the tablet terminal 2b. That is, according to the TV apparatus 1 of the present embodiment, it first becomes unnecessary to develop application programs for respective platform terminals.

In addition, the application program can be installed to operate a plurality of types of TV apparatuses 1 (that are capable of the foregoing operation) by a platform terminal. This eliminates the need to install a plurality of application programs.

That is, the TV apparatus 1 according to the present embodiment can improve the convenience of remote operations by platform terminals. A mechanism for supporting remote operations which the TV apparatus 1 according to the present embodiment provides will be described in detail below.

FIG. 2 is an exemplary diagram schematically showing a configuration of the TV apparatus 1.

As shown in FIG. 2, the TV apparatus 1 includes a processor 11, a main memory 12 an external storage device 13, a display device 14, an input device 15, a TV tuner 16, an audio output device 17, and a wireless communication device 18.

The processor 11 is a module that handles the operation control of the TV apparatus 1. The processor 11 loads various programs from the external storage device 13 into the main memory 12 and executes the programs to make the TV apparatus 1 functions as various means. The various programs include a remote operation support program 100 for enabling remote operations by platform terminals. Examples of the external storage device 13 include a nonvolatile memory.

The display device 14 is a module that is in charge of the output side of a user interface the TV apparatus 1 provides. On the other hand, the input device 15 is a module that is in charge of the input side of the user interface the TV apparatus 1 provides. More specifically, the input device 15 accepts a user's instruction. The result of processing executed by, for example, the various programs according to the instruction is presented to the display device 14. The display device 14 also displays an image obtained by decoding television program data received by the TV tuner 16. The decoding of the television program data may be performed by software or hardware. Sound obtained by decoding the television program data is output from the audio output device 17.

The wireless communication device 18 is a module that performs wireless communication compliant with the foregoing Wi-Fi™ standard, for example.

FIG. 3 is an exemplary diagram showing functional blocks of the remote operation support program 100 operating on the TV apparatus 1 having the foregoing configuration.

As shown in FIG. 3, the remote operation support program 100 includes a screen environment information reception module 101, an operation screen generation module 102, an operation screen transmission module 103, an operation information reception module 104, an operation content analysis module 105, and an operation control module 106.

The screen environment information reception module 101 is a module that receives screen environment information about a platform terminal by wireless communication by the wireless communication device 18. The operation screen generation module 102 is a module that generates an operation screen suitable for the platform terminal based on the screen environment information received by the screen environment information reception module 101. The operation screen transmission module 103 is a module that transmits the operation screen (image data) generated by the operation image generation module 102 to the platform terminal.

The operation information reception module 104 is a module that receives operation information from the platform terminal by wireless communication by the wireless communication device 18. The operation content analysis module 105 is a module that analyzes the content of the operation on the operation screen based on the operation information received by the operation information reception module 104. The operation control module 106 is a module that controls the operation of the TV apparatus 1 based on the content of the operation analyzed by the operation content analysis module 105.

Figure 4:
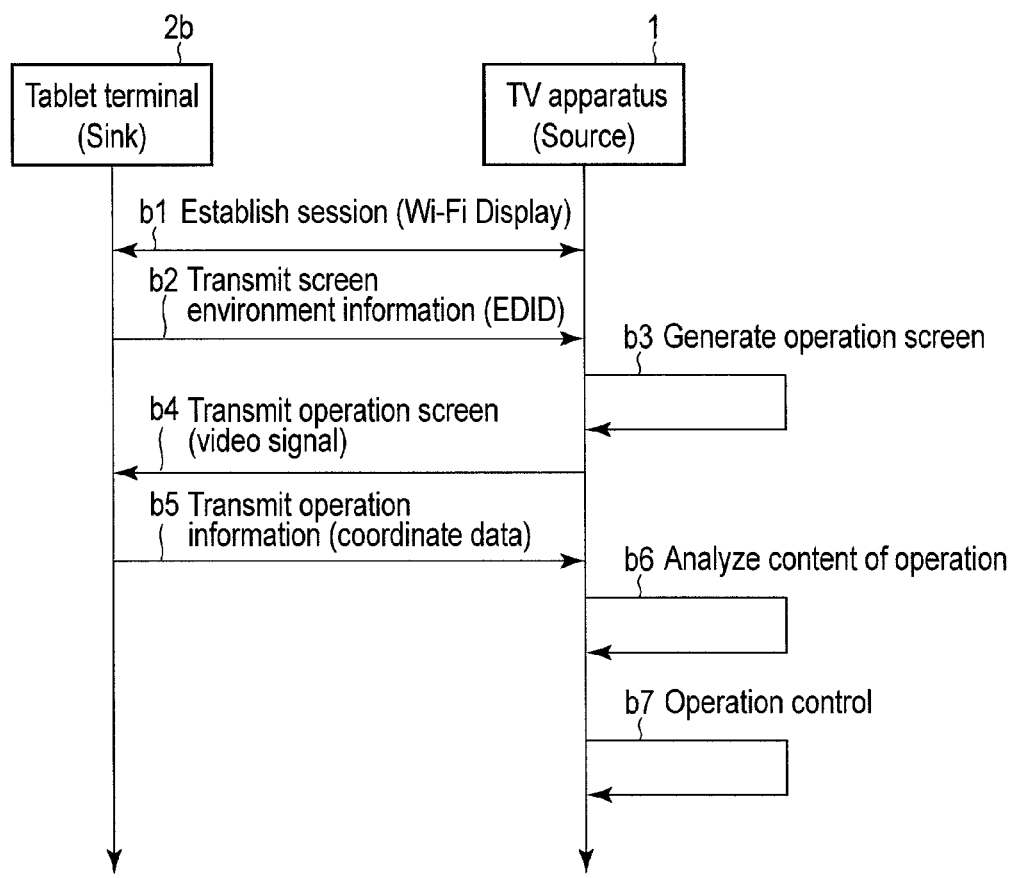
FIG. 4 is an exemplary diagram showing a communication sequence between the information processing apparatus and a platform terminal when remotely operating the information processing apparatus according to the embodiment by the platform terminal.

FIG. 4 shows a communication sequence between the TV apparatus 1 and the tablet terminal 2b when remotely operating the TV apparatus 1 by the tablet terminal 2b.

When operating the TV apparatus 1 by the tablet terminal 2b, the user activates the application program (for operating external devices including the TV apparatus 1) installed in the tablet terminal 2b. The application program on the tablet terminal 2b, when activated, attempts to establish a session for performing wireless communication with the TV apparatus 1 (b1 in FIG. 4). According to the Wi-Fi Display standard, the transmission side of image data is defined as a source, and the reception side of the image data as a sink. To establish the session for wireless communication between the tablet terminal 2b and the TV apparatus 1, the tablet terminal 2b and the TV apparatus 1 then negotiate with each other according to a predetermined procedure so that the tablet terminal 2b which receives image data for an operation screen serves as a sink and the TV apparatus which transmits the image data for the operation screen serves as a source.

Establishing the session, the tablet terminal 2b transmits EDID to the TV apparatus 1 (b2 in FIG. 4). Based on the EDID, the TV apparatus 1 generates an operation screen suitable for the display on the tablet terminal 2b side (b3 in FIG. 4), and transmits a video signal thereof to the tablet terminal 2b (b4 in FIG. 4).

The tablet terminal 2b displays the operation screen by using the video signal. If a touch operation is made on the operation screen, the tablet terminal 2b transmits coordinate data indicating the touched position to the TV apparatus 1 as operation information (b5 in FIG. 4). Based on the operation information, the TV apparatus 1 analyzes the content of the operation on the operation screen, made on the tablet terminal 2b (b6 in FIG. 4). Based on the analysis result, the TV apparatus 1 performs the operation control of the TV apparatus 1 (b7 in FIG. 6).

Figure 5:
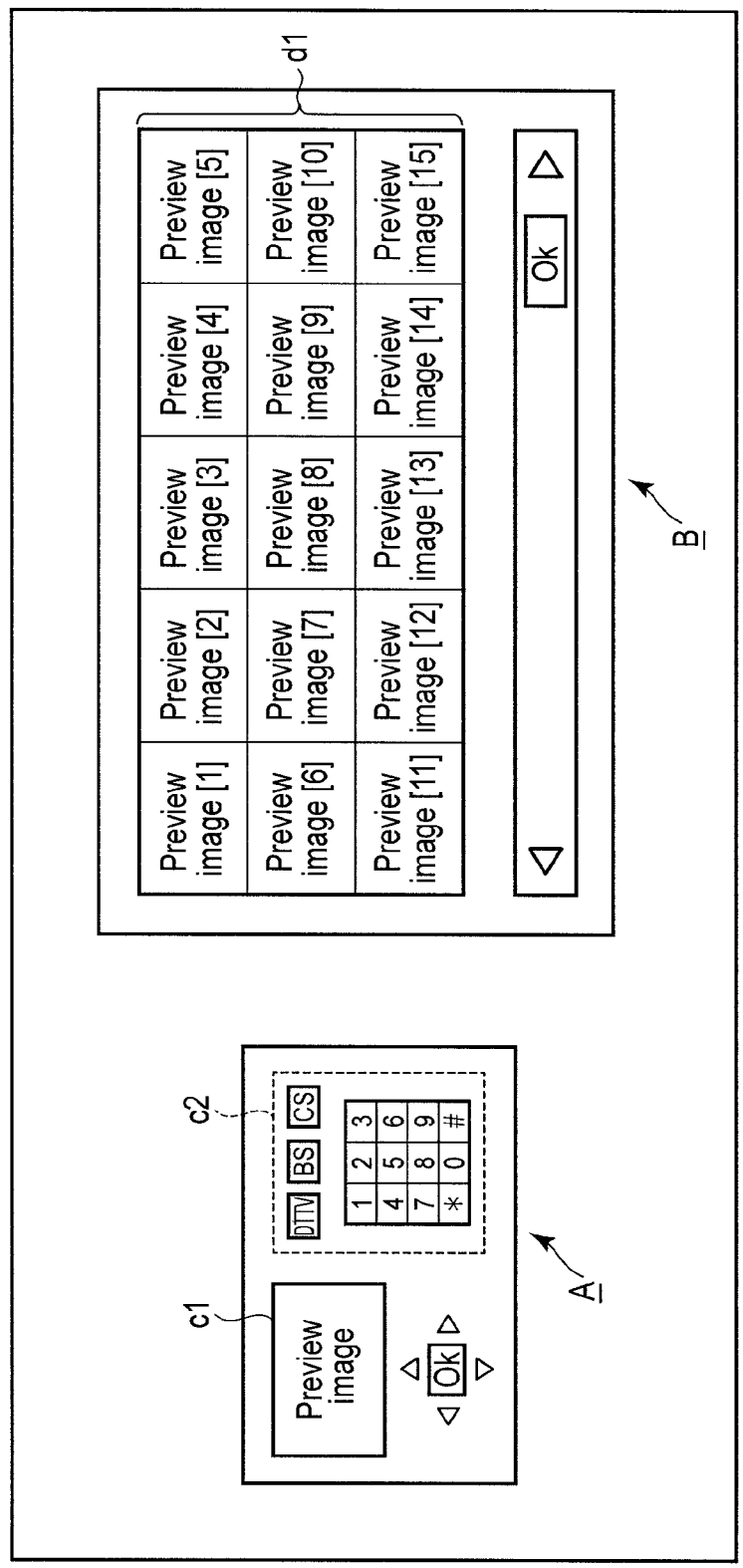
FIG. 5 is an exemplary diagram showing examples of an operation screen generated by the information processing apparatus based on screen environment information about platform terminals.

FIG. 5 is an exemplary diagram showing examples of an operation screen generated by the TV apparatus 1 based on screen environment information about the platform terminals.

In FIG. 5, "A" shows an example of the operation screen (for operating the TV apparatus 1) that the TV apparatus 1 generates for the smartphone 2a, and "B" shows an example of the operation screen (for operating the TV apparatus 1) that the TV apparatus generates for the tablet terminal 2b (which comprises a touch screen display having a screen size greater than that of the smartphone 2a).

As shown in "A" of FIG. 5, a display area c1 for displaying an image that is being displayed on the TV apparatus 1, for example, and a group of operation buttons c2 for selecting channels, for example, are arranged on the operation screen for the smartphone 2a. The TV apparatus 1 and the platform terminals including the smartphone 2a can transmit and receive video signals according to a procedure compliant with the Wi-Fi Display standard. The TV apparatus 1 can thus arrange on the operation screen the display area c1 for displaying an image included in television broadcast program data being received, for example, and transmit the video signal of the image to be displayed in the display area c1. The user operates the group of operation buttons c2 to select an arbitrary channel. The video image of the selected channel is displayed in the display area c1. The user can thus select channels while checking the video images of the respective channels on the smartphone 2a side.

As shown in "B" of FIG. 5, a display area d1 for displaying the video images of the channels are arranged on the operation screen for the tablet terminal 2b as operation objects for selecting the respective channels. Here, the TV apparatus 1 is assumed to include a plurality of TV tuners 16. While FIG. 5 shows 15 channels of video images, the TV apparatus 1 need not necessarily include 15 TV tuners 16. For example, a TV tuner 16 may acquire a plurality of channels of video images in succession and transmit the video signals for the 15 still images to the tablet terminal 2b. It will be understood that the video image displayed in the display area c1 on the operation screen for the smartphone 2a shown in "A" of FIG. 5 may also be a still image.

The user can make a touch operation on a video image he/she wants to view, whereby the channel broadcasting the video image is selected. That is, the user can select channels while checking the video images of the respective channels on the tablet terminal 2b side.

Such a simultaneous display of a plurality of video images is only available to the tablet terminal 2b which includes the touch screen display having a large screen size. This indicates the effectiveness of performing the generation of an operation screen including the arrangement of operating objects according to the screen size and/or aspect ratio.

It will be understood, for example, that the display area for displaying the video image(s) of the channel(s) being received by the TV tuner(s) 16 need not necessarily be arranged on the operation screen.

Suppose, for example, that a touch operation is made on a position other than the group of operation buttons c2 (including the display area c1) on the operation screen for the smartphone 2a shown in "A" of FIG. 5. Even in such a case, the smartphone 2a transmits the operation information to the TV apparatus 1. That the operation is not one on the group of operation buttons c2 is recognized by the analysis on the TV apparatus 1 side. That is, the platform terminal side need not be aware of the configuration of the operation screen.

Figure 6:
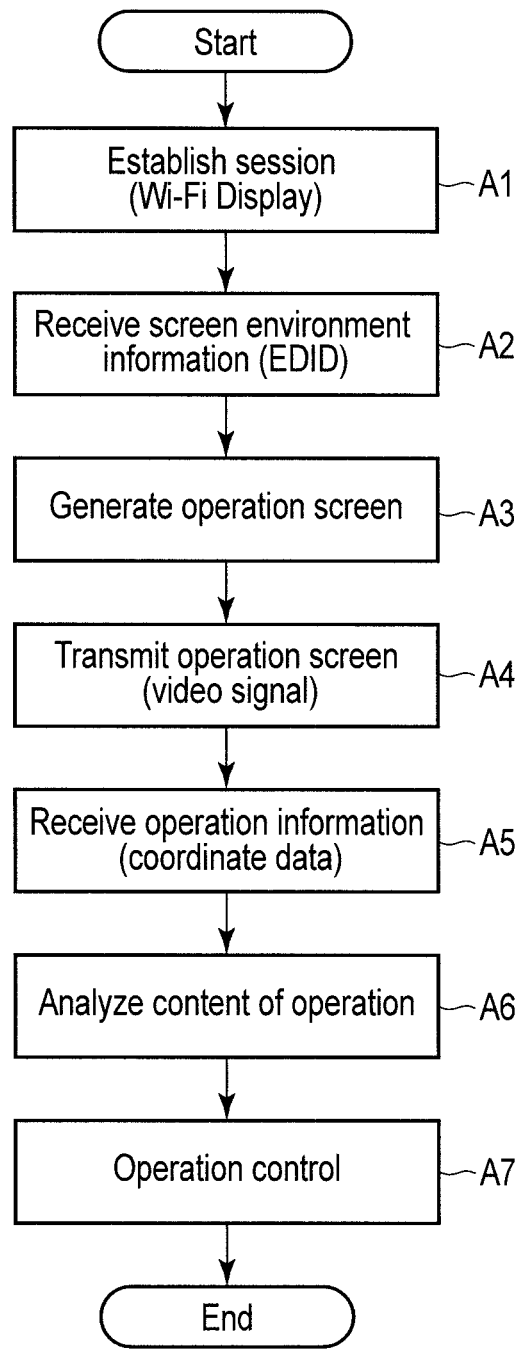
FIG. 6 is an exemplary flowchart showing an operation flow related to a remote control of the information processing apparatus according to the embodiment.

FIG. 6 is an exemplary flowchart showing an operation flow related to the remote operation of the TV apparatus 1.

Establishing a session for performing wireless communication with a platform terminal (block A1), the TV apparatus 1 initially receives screen environment information from the platform terminal (block A2). The TV apparatus 1 generates an operation screen (for operating the TV apparatus 1) based on the received screen environment information (block A3), and transmits video data thereof to the platform terminal (block A4).

The TV apparatus 1 receives operation information from the platform terminal (block A5), and analyzes the content of the operation on the operation screen based on the operation information (block A6). Based on the analysis result, the TV apparatus 1 performs the operation control of the TV apparatus 1 (block A7).

As described above, according to the TV apparatus 1, (a) application programs need not be developed for respective platform terminals, and (b) a plurality of application programs need not be installed in a platform terminal.

That is, according to the TV apparatus 1, the convenience of remote operations by platform terminals can be improved.

Since the operation procedure of the present embodiment can be implemented by software, similar effects to those of the present embodiment can be easily obtained by introducing the software into an ordinary computer via a computer-readable storage medium.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a wireless communication module;
a first information receiver configured to receive first information associated with a display function of an external device from the external device by wireless communication by the wireless communication module;
an operation screen transmitter configured to generate an operation screen for the external device to operate the apparatus based on the first information received by the first information receiver, and to transmit a video signal of the generated operation screen to the external device by wireless communication by the wireless communication module;
a second information receiver configured to receive second information associated with content of an operation on an operation screen from the external device by wireless communication by the wireless communication module, the operation screen being displayed using the video signal transmitted by the operation screen transmitter, the second information comprising, coordinate data indicative of an operation position on the operation screen displayed on the external device; and
a controller configured to analyze the content of the operation on the operation screen based on the coordinate data in the second information received by the second information receiver, and to control operation of the apparatus based on result of analysis of the content of the operation.

2. The apparatus of claim 1, wherein:
the first information comprises at least one of a screen size, an aspect ratio and resolution; and
the operation screen transmitter is configured to generate the operation screen based on at least one of the screen size, the aspect ratio and the resolution in the first information.

3. The apparatus of claim 1, wherein the operation screen transmitter is configured to determine arrangement of an operating object arranged on the operation screen based on the first information.

4. The apparatus of claim 1, further comprising a reproducer configured to reproduce content comprising an image,
wherein the operation screen transmitter is configured to arrange a display area of the image in the content to be reproduced by the reproducer on the operation screen based on the first information, and to transmit a video signal of the operation screen comprising the image in the content to the external device by wireless communication by the wireless communication module.

5. The apparatus of claim 4, wherein the operation screen transmitter is configured to determine whether to arrange the display area on the operation screen or how many display areas to arrange on the operation screen based on the first information.

6. The apparatus of claim 4, wherein the operation screen transmitter is configured to arrange the display area on the operation screen as an operating object.

7. The apparatus of claim 4, further comprising a TV data receiver configured to receive television broadcast program data,
wherein the operation screen transmitter is configured to transmit a video signal of the operation screen comprising an image in the television broadcast program data received by the TV data receiver to the external device as a video signal of an image to be displayed in the display area by wireless communication by the wireless communication module.

8. A remote operation support method of an information processing apparatus, the method comprising:
receiving first information associated with a display function of an external device from the external device by wireless communication;
generating an operation screen for the external device to operate the apparatus based on the received first information, and transmitting a video signal of the generated operation screen to the external device by wireless communication;
receiving second information associated with content of an operation on an operation screen from the external device by wireless communication, the operation screen being displayed by the transmitted video signal, the second information comprising coordinate data indicative of an operation position on the operation screen displayed on the external device;
analyzing the content of the operation on the operation screen based on the coordinate data in the received second information; and
controlling operation of the apparatus based on result of analysis of the content of the operation.

9. A computer-readable, non-transitory storage medium having stored thereon a computer program which is executable by a computer, the computer program controlling the computer to function as:
a first information receiver configured to receive first information associated with a display function of an external device from the external device by wireless communication by a wireless communication module;
an operation screen transmitter configured to generate an operation screen for the external device to operate the computer based on the first information received by the first information receiver, and to transmit a video signal of the generated operation screen to the external device by wireless communication by the wireless communication module;
a second information receiver configured to receive second information associated with content of an operation on an operation screen from the external device by wireless communication by the wireless communication module, the operation screen being displayed by the video signal transmitted by the operation screen transmitter, the second information comprising coordinate data indicative of an operation position on the operation screen displayed on the external device; and
a controller configured to analyze the content of the operation on the operation screen based on the coordinate data in the second information received by the second information receiver, and to control operation of the computer based on result of analysis of the content of the operation.

* * * * *